Mar. 6, 1923. 1,447,171
R. B. BENJAMIN ET AL
SWITCH
Filed June 21, 1915 4 sheets-sheet 1
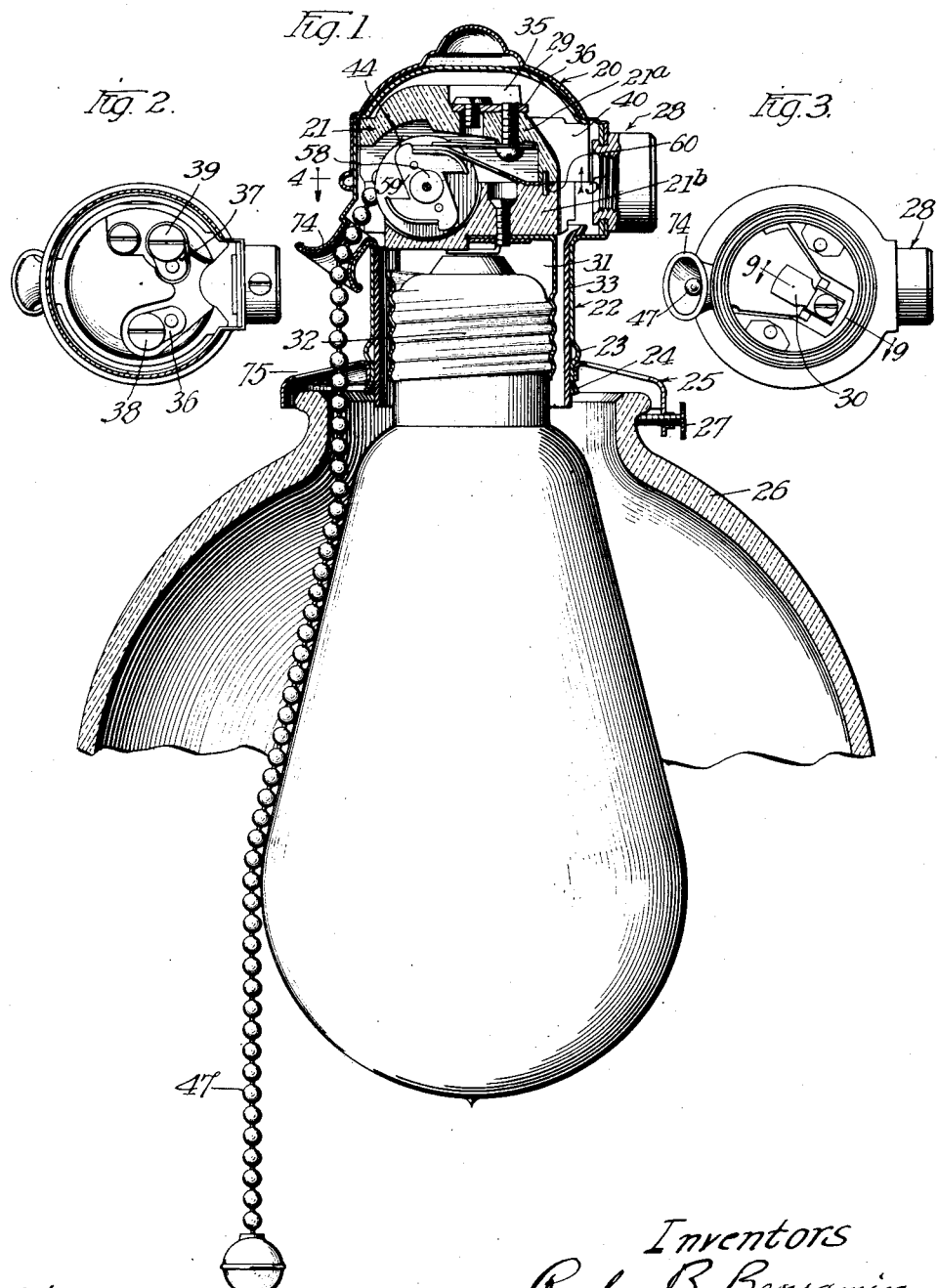

Mar. 6, 1923. 1,447,171
R. B. BENJAMIN ET AL
SWITCH
Filed June 21, 1915 4 sheets-sheet 2
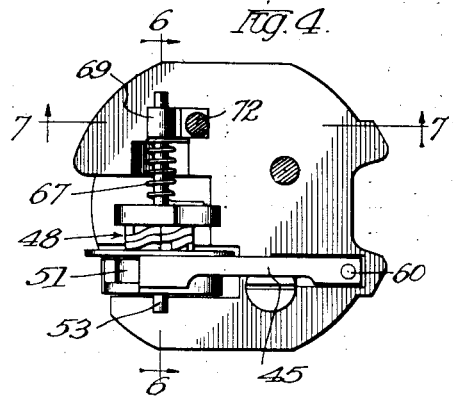
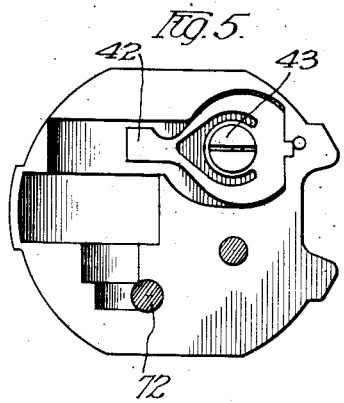
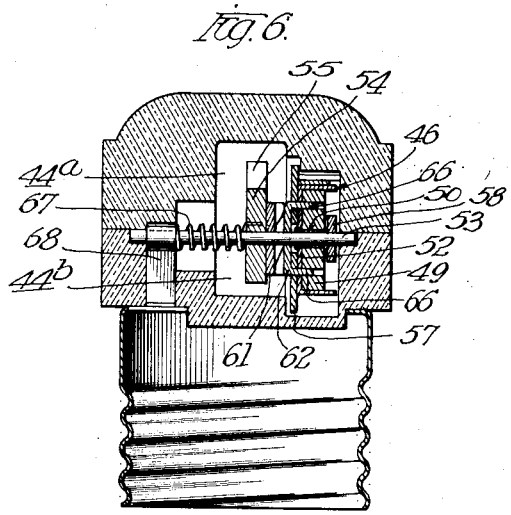
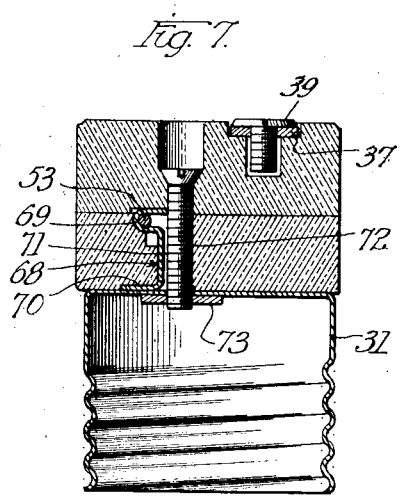
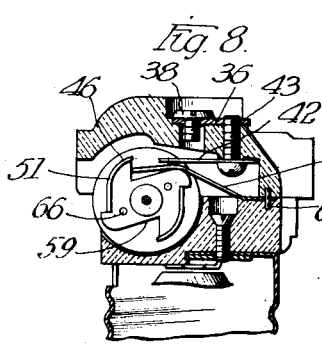
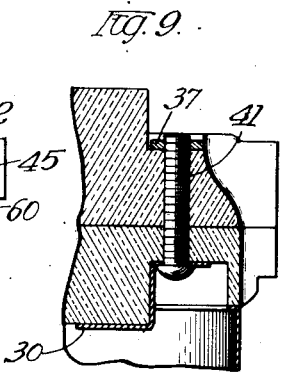
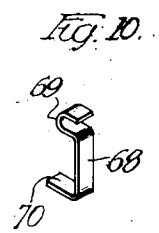

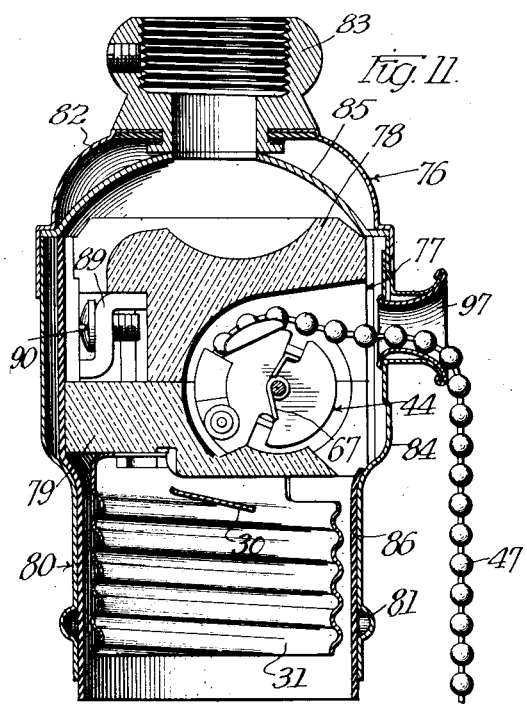
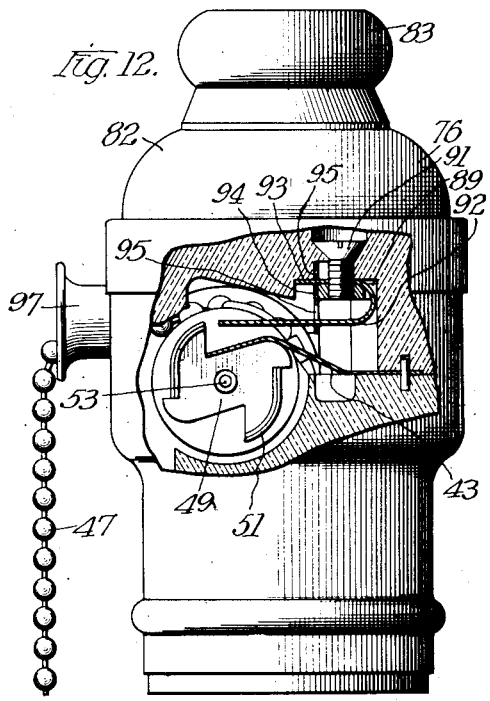
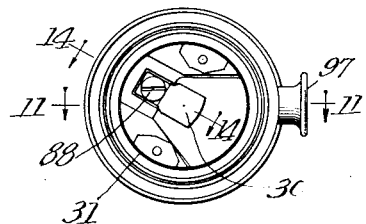
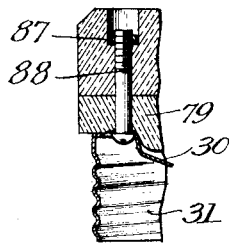

Mar. 6, 1923.
R. B. BENJAMIN ET AL
SWITCH
Filed June 21, 1915
1,447,171
4 sheets-sheet 4
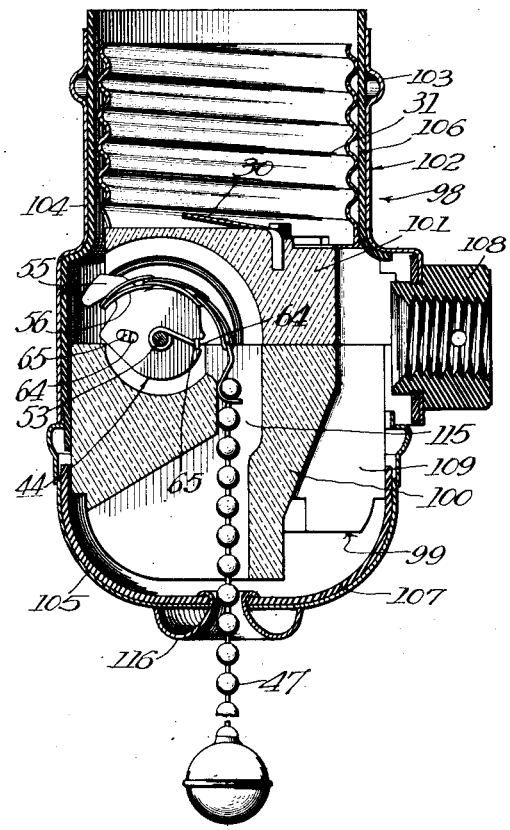
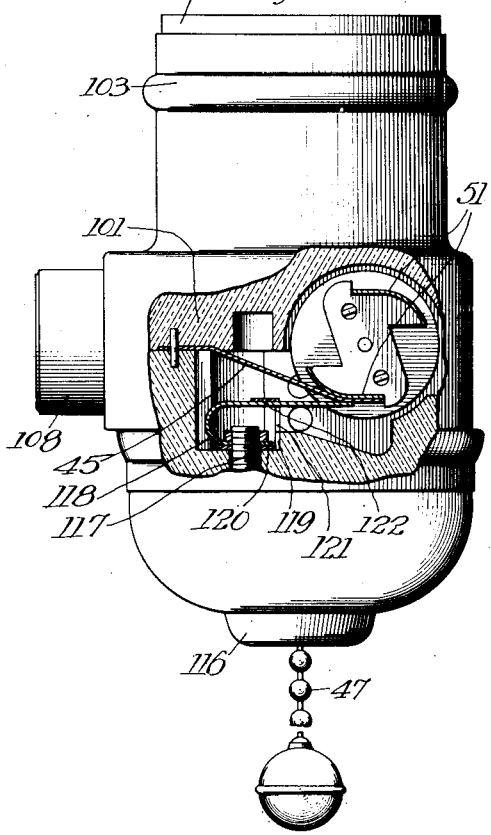
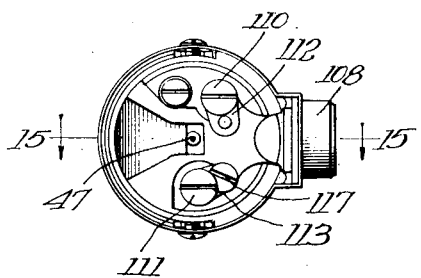
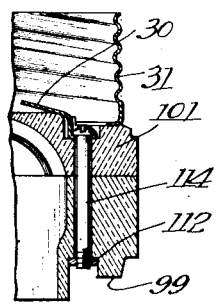
Inventors
Reuben B. Benjamin
Edwin A. Detrick
Witnesses:

Patented Mar. 6, 1923.

1,447,171

UNITED STATES PATENT OFFICE.

REUBEN B. BENJAMIN AND EDWIN A. DETRICK, OF CHICAGO, ILLINOIS, ASSIGNORS TO BENJAMIN ELECTRIC MANUFACTURING COMPANY, OF CHICAGO, ILLINOIS, A CORPORATION OF ILLINOIS.

SWITCH.

Application filed June 21, 1915. Serial No. 35,329.

*To all whom it may concern:*

Be it known that we, REUBEN B. BENJAMIN and EDWIN A. DETRICK, both citizens of the United States, residing at Chicago, in the county of Cook and State of Illinois, have jointly invented new and useful Improvements in Switches, of which the following is a full, clear, concise, and exact description, reference being had to the accompanying drawings, forming a part of this specification.

Our invention relates to switches, and more specifically to pull switches used in connection with lamp sockets.

Among the objects of our invention is to provide an improved switch of this character in which arcing when the contact is broken shall be reduced to a minimum, and which shall be simple in construction and operation and efficient in use.

Further objects will appear from the detailed description to follow taken in connection with the appended claims.

In the accompanying drawings, in which we have shown various embodiments of our invention, Fig. 1 is an axial section showing our invention in connection with an angle lamp socket showing the manner in which the pull member is led from the switch, and showing the manner in which the switch and contacts are mounted in the socket;

Fig. 2 is a plan view of the socket of Fig. 1, the cap of the socket being removed to show the location of the binding posts;

Fig. 3 is a bottom view of the socket;

Fig. 4 is a section on the line 4—5 of Fig. 1 looking downward, showing the manner in which the switch mechanism is mounted on the insulating base;

Fig. 5 is a section on the line 4—5 of Fig. 1 looking upward;

Fig. 6 is a section on the line 6—6 of Fig. 4, showing the electrical connection between the movable member of the switch and the threaded shell contact, and showing also the actuating mechanism for the switch;

Fig. 7 is a section on the line 7—7 of Fig. 4 showing the manner in which the base sections are held together, and also showing part of the circuit between the threaded shell contact and the movable member of the switch;

Fig. 8 is a fragmentary sectional view taken on the same plane as Fig. 1 showing the switch contact broken;

Fig. 9 is a section on the line 9—9 of Fig. 3 showing the connection between the center contact and its binding plate;

Fig. 10 is a perspective view of a sheet metal strip forming part of the circuit between the shell contact and the switch;

Fig. 11 is an axial section showing our invention in connection with a straight socket, showing the manner in which the pull member is led from the socket and the manner in which the switch and contacts are mounted in the socket;

Fig. 12 is a side elevation of the modification of Fig. 11, parts being broken away to show the details of the switch;

Fig. 13 is a bottom view on a reduced scale of the socket shown in Fig. 11;

Fig. 14 is a sectional view on the line 14—14 of Fig. 13 showing the manner in which the center contact is connected to its binding plate;

Fig. 15 is an axial section showing our invention in connection with an inverted angle socket, showing the manner in which the pull member leads from the socket, and showing the manner in which the switch and contacts are mounted in the socket;

Fig. 16 is a side elevation of the modification of Fig. 15, parts being broken away to show details of the switch;

Fig. 17 is a bottom view on a reduced scale of the socket shown in Fig. 15, the cap being removed to show the location of the binding screws; and Fig. 18 is a sectional detail showing the manner in which the center contact is connected to its binding plate.

Referring now to the drawings in detail, and first to the modification of Figs. 1 to 10, inclusive, in this modification we have shown our invention in connection with an angle lamp socket 20 comprising a two part insulating base 21 formed of the two base portions 21ª and 21ᵇ and a casing 22 for the insulating base, and the parts carried thereby. The casing 22 is provided with an annular bead 23 and is flared outwardly at its lower end as shown at 24 to provide means for attachment for a shade holder 25, to which the shade 26 is secured by means of screws 27. For securing the socket to a conduit the casing has secured thereto a screw threaded bushing 28. The casing is provided with the usual cap 29. Secured to the insulating base 21 are the usual center and shell contacts 30 and 31, for engagement with the corresponding contacts of a lamp base 32. An insulating cap or sleeve 33 is provided between the shell contact 31 and the casing 22. The upper portion $21^a$ of the base 21 is provided with a recess 35 in which are located the binding plates 36 and 37 in which are threaded the binding screws 38 and 39. The base 21 is provided with a channel or passage 40 in which are located the conductors leading from the bushing 28 to the binding screws 38 and 39. The binding plate 37 is connected to the center contact 30 by means of a screw 41, as shown in Fig. 9, this screw also assisting in holding the two parts of the insulating base together. The binding plate 36 is electrically connected with a spring contact plate 42 by means of a screw 43 extending through an opening in the contact plate and threaded into the binding plate. The switch mechanism, indicated in general at 44, is located in communicating recesses $44^a$ and $44^b$ in the base portions $21^a$ and $21^b$, respectively.

The switch mechanism comprises a spring contact member 45, a rotatable contact member 46 movable into and out of engagement with the member 45, a pull chain 47 for operating the switch, and a ratchet mechanism 48 forming part of the transmission between the pull chain 47 and the rotatable member of the switch. The rotatable contact member 46 is supported on an insulating member 49 to which it is secured by means of a hollow rivet or eyelet 50.

The contact 46 comprises curved contact or brush portions 51 for engagement with the spring contact 45, and a flat portion 52 which engages the side of the insulating member 49. The insulating member 49 is rotatably mounted on a shaft 53 formed of conducting material which is held in place between the two base sections $21^a$ and $21^b$. Rotatably mounted on this shaft 53 is a switch lever or wheel 54 provided with a lug or projection 55 over which engages a link 56 (see Fig. 14) connected with the pull chain 47. An insulating fibre disc or washer 57 is placed between the rotatable contact 46 and the pull chain 47 to prevent any possibility of these parts coming in contact. An insulating spacing washer 58 is provided between the insulating member 49 and the wall of the recess in which the switch is located. The insulating member 49 is cut away, as shown at 59, to permit the spring contact 45 to spring away from the contact plate 42 when the contact brush 51 disengages the contact 45, as shown in Fig. 8. The insulating member 49 together with the contact brush 51 form a rotatable cam-wheel having a pair of conducting cam portions formed by the contact brush 51, and having a pair of non-conducting cam portions formed by those parts of the insulating member 49 between the conducting cam portions. Each of the conducting portions terminates in a drop, and each of the non-conducting cam portions terminates in a drop, the drop from the conducting cam portion onto the non-conducting portion being considerably greater than the drop from the non-conducting cam portion onto the conducting cam portion. The spring contact 45 is held in place between the base portions $21^a$ and $21^b$ by means of a pin 60, as shown in Figs. 1 and 8.

The ratchet mechanism 48 comprises two toothed members 61 and 62 which may be of stamped sheet metal, the member 61 being provided with lugs 63 struck up therefrom which extend into openings 64 in the switch lever 54, and the member 62 being provided with lugs 66 which extend through openings in the insulating disc 57, the rotatable contact 46 and the insulating member 49, as shown in Fig. 6. A torsion spring 67 is provided for returning the switch lever 54 after it has been operated by means of the pull chain 47. The shaft 53 is electrically connected to the shell contact 31 by means of a sheet metal strip 68 having a curved portion 69 embracing the shaft, and a flat portion 70 engaging a flat portion of the shell contact 31. This strip 68 passes through an opening 71 in the lower base portion $21^b$, through which opening also passes a screw 72 which engages a nut 73 to hold the base portions $21^a$ and $21^b$ together and also to hold the shell contact 31 on the base.

The casing 22 is provided with a chain guide or horn 74 through which the pull chain 47 is led from the switch lever 54 to an opening 75 in the shade holder 25 from whence the pull chain passes downwardly between the lamp and the shade.

It will be noted that the chain guide 74 extends downwardly at an acute angle to the axis of the socket so that there are no abrupt changes in direction of the pull chain 47.

In this modification the circuit through the socket is from the binding screw 39, through the binding plate 37, screw 41 (Fig. 9) center contact 30, lamp circuit, shell contact 31, strip 68 (Figs. 6 and 7) shaft 53, rotatable contact member 46, spring contact 45 (Fig. 1) spring contact 42, screw 43 (Fig. 8) and binding plate 36 to the binding screw 38.

The operation of the device of this modification is as follows: Assuming that the parts are in the position shown in Fig. 1, the circuit will be closed and the lamp will be lit. If it is desired to open the circuit the pull chain 47 is pulled downward causing the insulating member 49 to be turned counter-clockwise, as shown in Figs. 1 and 8, the teeth on the members 61 and 62 being inclined so that counter-clockwise movement of the driving member 61 will be transmitted to the member 62.

It will be noted that during the movement of the member 49 from the position shown in Fig. 1 to the position shown in Fig. 8 the spring contact 45 will be in contact both with the spring contact 42 and the movable contact 51 until the instant when the member 45 slips off of the brush 51, when the contact between 45, 42 and 51 will be broken substantially simultaneously, as the member 45 springs down into the depression 59. This simultaneous double break reduces arcing between the contacts to a minimum, permitting the socket to be given a high rating. Thus with a pressure of 250 volts this pull switch socket is given a rating of 660 watts, whereas the ordinary pull switch socket is given a rating of 250 watts. When the pull member 47 is released the spring 67 will return the switch lever 54 to a position in which the teeth of the member 61 will engage the teeth of the member 62 in another position, the spring 67 yielding to permit the lever 54 to move in an axial direction along the shaft 53 to permit the teeth on the members 61 and 62 to slide past each other to engage in a new position.

The next operation of the pull chain 47 will, of course, bring the parts again into the position shown in Fig. 1 in which the circuit is closed.

As previously stated, the drop from the conducting cam portion onto the non-conducting cam portion is considerably greater than the drop from the non-conducting portion onto the conducting cam portion. Due to the greater drop from the conducting cam portion onto the insulating cam portion, when the spring contact 45 snaps off from the conducting cam portion onto the non-conducting cam portion, it (the spring contact 45) moves completely out of contact with the spring contact plate 42, so that in this position it is completely insulated both from the spring contact 42 and from the rotatable contact member 46. When now the cam moves, in a counter-clockwise direction, from the last discussed position (see Fig. 8) to the position shown in Fig. 1, the contacts assume the relative positions shown in the latter figure, the member 45 being raised into contact with the member 42 by the contour of portion 44 of the cam. Further progressive movement of the cam causes the member 45 to ride over the portion 44 and drop into contact with element 51. Due to the relatively small drop from the non-conducting cam portion onto the conducting cam portion, the spring contact 45 does not move out of contact with the spring contact 42, the parts assuming the position shown in Fig. 1, in which the circuit from the contact 42 to the contact 46 is completed through the spring contact member 45.

In the modification of Figs. 11 to 14, we have shown our invention in connection with a straight lamp socket 76 comprising a two part insulating base 77 formed of the upper and lower portions 78 and 79, respectively, and a casing 80 provided with a bead 81 for supporting a shade holder. In this modification the center and shell contacts 30 and 31, the switch mechanism 44, the spring contact 45 and the pull chain 47 are essentially similar to the corresponding parts of the modification of Figs. 1 to 10 and will accordingly not be described again in detail. The casing 80 comprises a cap 82 to which is secured a threaded bushing 83 for securing the socket to a conduit, and a shell portion 84. The cap is provided with an insulating lining 85 which may be of fibre, and the shell is provided with an insulating lining or cup 86. The center contact 30 is electrically connected to its binding plate 87 by means of a screw 88 which also serves to hold the parts of the base together. Seated in a recess in the insulating base 77 is a binding plate 89 (Figs. 11 and 12) in which is threaded a binding screw 90, the binding plate 89 being held in place by means of a screw 91 (Fig. 12), which screw also passes through an opening in a U-shaped spring contact or brush 92 having a base portion 93 lying between the binding plate 89 and the base 77. A sheet metal clip 94 is provided to limit the movement of the spring contact 92, this clip having an opening 95 through which the base portion 93 extends to hold the clip in place, and also having an opening 96 through which the free end of the U-shaped contact extends, the movement of the free arm of the contact being limited by engagement with the edge of the opening 96. The casing 80 is provided with a chain guard or horn 97 through which the pull chain 47 is led from the switch lever.

In this modification the circuit through the socket is from the binding plate 87, through the screw 88, center contact 30, lamp circuit, shell contact 31, to the shaft 53, and to the curved movable contact portion or brush 51.

The operation of the switch of the device of this modification is essentially similar to the operation of the modification of Figs. 1 to 10, inclusive, and hence need not be described in detail.

In the modification of Figs. 15 to 18, inclusive, we have shown our invention in connection with an inverted angle socket 98 comprising a two part insulating base 99

(comprising two base portions 100 and 101) and a casing 102 provided with a bead 103 for supporting a shade. In this modification the center and shell contacts 30 and 31, the switch mechanism 44, the spring contact 45, and the pull chain 47 are essentially similar to the corresponding parts of the modifications previously described.

The casing 102 comprises a shell portion 104 and a cap portion 105 detachably secured together in any suitable manner, the shell being provided with an insulating lining 106, and the cap being provided with an insulating lining 107. The shell is also provided with a threaded bushing 108 for securing the socket to a conduit. The base 99 is provided with a channel or passage 109 for the leading-in wires from the conduit 108 to the binding screws 110 and 111 which are threaded in the binding plates 112 and 113 (Fig. 17). The binding plate 112 is electrically connected with the center contact 30 by means of a screw 114 which also serves to hold the two parts of the base together. The base 99 is provided with a channel or passage 115 for the pull chain 47, the cap 105 being provided with an eyelet 116 forming a chain guide through which the pull chain is led. The binding plate 113 is electrically connected by means of a screw 117 with a U-shaped contact spring or brush 118, the screw 117 also serving to secure the brush 118 in place on the insulating base. The screw 117 also serves to hold in place a clip 119, the purpose of which is to limit the movement of the contact spring 118. The clip has a base 120 held in place between the contact spring 118 and the insulating base and is provided with an opening 121 through which the contact spring extends, and is also provided with a bent over portion 122 with which the spring 118 engages and by which its movement is limited.

In this modification the circuit is from the binding screw 110 through the binding plate 112, screw 114, center contact 30, lamp circuit, shell contact 31 to the shaft 53 and to the movable contact brush 51.

The operation of the switch of this modification is substantially the same as that of the previous modifications.

Having thus described our invention what we claim as new and desire to secure by Letters Patent is;—

1. A pull switch socket comprising a receptacle contact and a wiring terminal and switch mechanism for controlling the circuit between said terminal and contact comprising a rotatable ratchet-like cam-wheel, said cam-wheel having a non-conducting cam terminating in a drop, said cam-wheel also having a conducting cam terminating in a drop greater than that of the non-conducting cam, a contact member held against said cams as it progressively comes into contact therewith, and insulated both from the receptacle contact and from the wiring terminal when in engagement with said non-conducting cam, and a second contact adjacent said first contact and engaged by it when said first contact engages the conducting cam, the drop from said conducting cam onto said insulating cam being so great that said first contact disengages said second contact when said first contact drops onto said non-conducting cam and, after said first contact has again been brought into contact with said second contact by the progressive movement of said non-conducting cam, the drop from the latter onto said conducting cam being so small that said first contact does not disengage said second contact as the latter drops onto said conducting cam.

2. A pull switch socket comprising a receptacle contact and a wiring terminal and switch mechanism for controlling the circuit between said terminal and contact comprising a rotatable ratchet-like cam-wheel, said cam-wheel having a non-conducting cam terminating in a drop, said cam-wheel also having a conducting cam terminating in a drop greater than that of the non-conducting cam, a contact member held against said cams as it progressively comes into contact therewith, and insulated both from the receptacle contact and from the wiring terminal when in engagement with said non-conducting cam, and a spring contact adjacent said first contact and engaged by it when said first contact engages the conducting cam, the drop from said conducting cam onto said insulating cam being so great that said first contact disengages said spring contact when said first contact drops onto said non-conducting cam and, after said first contact has again been brought into contact with said second contact by the progressive movement of said non-conducting cam, the drop from the latter onto said conducting cam being so small that said first contact does not disengage said spring contact as it drops onto said conducting cam, and means for limiting the movement of said spring contact as said first contact drops from said conducting cam onto said non-conducting cam.

In witness whereof, we have hereunto subscribed our names.

REUBEN B. BENJAMIN.
EDWIN A. DETRICK.